United States Patent
Yamamoto

(10) Patent No.: US 6,453,109 B1
(45) Date of Patent: Sep. 17, 2002

(54) VIDEO-SIGNAL PROCESSING APPARATUS PROVIDING A FIRST CLOCK SIGNAL AND SECOND CLOCK SIGNAL WHICH IS BASED ON THE PHASE OF THE INPUT SIGNAL

(75) Inventor: Yukinori Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/114,513

(22) Filed: Jul. 14, 1998

(30) Foreign Application Priority Data

Jul. 23, 1997 (JP) .............................................. 9-197013

(51) Int. Cl.[7] .............................. H04N 9/87; H04N 7/00; H04N 11/00; G11B 5/09
(52) U.S. Cl. ............................. 386/13; 348/498; 360/51
(58) Field of Search ................................ 386/13, 1, 16, 386/17–20, 40; 348/498–499, 642, 659, 660, 654, 539, 549; 360/51

(56) References Cited

U.S. PATENT DOCUMENTS

| | | | | |
|---|---|---|---|---|
| 5,200,834 A | * | 4/1993 | Iwaibana et al. | 386/24 |
| 5,475,439 A | * | 12/1995 | Shimokoriyama | 386/44 |
| 5,596,554 A | * | 1/1997 | Hagadorn | 345/34 |
| 5,745,314 A | * | 4/1998 | Ikeda et al. | 360/51 |
| 5,982,574 A | * | 11/1999 | Leake et al. | 360/77.12 |
| 6,002,536 A | * | 12/1999 | Arai et al. | 386/112 |
| 6,115,265 A | * | 9/2000 | Barlage | 363/97 |
| 6,292,016 B1 | * | 9/2001 | Jefferson et al. | 326/39 |

* cited by examiner

*Primary Examiner*—Andrew B. Christensen
*Assistant Examiner*—Polin Chieu
(74) *Attorney, Agent, or Firm*—Fitzpatrick, Cella, Harper & Scinto

(57) ABSTRACT

A signal processing apparatus includes a first clock generation circuit for generating a first clock signal having a constant frequency, a detection circuit for detecting a phase change in an input video signal, a second clock generation circuit for generating a second clock signal having a frequency different from the frequency of the first clock signal by selectively using the first clock signal and an output from the detection circuit, and a signal processing circuit for processing the video signal using the second clock signal.

29 Claims, 6 Drawing Sheets

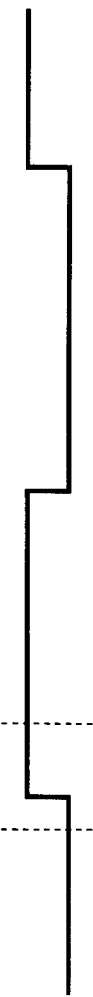
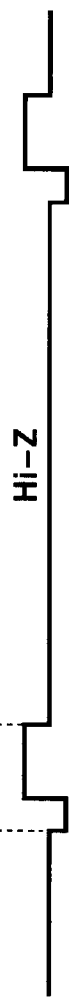
FIG.8(a) HSYNC & BURST
FIG.8(b) DETECTED VALUE OF COLOR PHASE ERROR
FIG.8(c) PWM ENABLE
FIG.8(d) PWM SIGNAL OUTPUT (LOCKED TO BURST)
FIG.8(e) OUTPUT AFTER FREQUENCY DIVISION OF 27-MHz CLOCK SIGNAL
FIG.8(f) PWM SIGNAL OUTPUT (LOCKED TO 27-MHz CLOCK SIGNAL)

VIDEO-SIGNAL PROCESSING APPARATUS PROVIDING A FIRST CLOCK SIGNAL AND SECOND CLOCK SIGNAL WHICH IS BASED ON THE PHASE OF THE INPUT SIGNAL

BACKGROUND OF THE INVENTION

1. Field of the Invention

The present invention relates to a video-signal processing apparatus, and more particularly, to the generation of a clock signal for processing a video signal.

2. Description of the Related Art

Digital VCR's (video cassette recorders) which (i) record a video signal, supplied:. from the outside, on a magnetic tape by digitizing the signal, and (ii) output a reproduced digital video signal to the outside are known.

It is desirable that such digital VCR's, as well as conventional analog VCR's, record/reproduce both a digital video signal supplied from the outside and an analog video signal supplied from the outside.

In order to record/reproduce various video signals supplied from the outside, a plurality of clock signals having different frequencies are required in an input/output circuit and a signal processing circuit for a video signal.

For example, in a circuit for inputting/outputting a digital video signal, a clock signal synchronized with an input digital video signal is required. In a circuit for inputting/outputting an analog video signal, a clock signal synchronized with a horizontal synchronizing signal in the input video signal, or a clock signal having a frequency equal to an integer multiple of a subcarrier frequency is frequently used. In a circuit for compressing/encoding a digital video signal, a clock signal different from these clock signals is also used.

When a plurality of circuit blocks having different operational clock frequencies are present, it is difficult to perform system design because, for example, additional circuits, such as FIFO (first-in first-out) memory and the like, are required in order to exchange a signal between the blocks, and timing control between signals is required.

If it is intended to commonly use a clock frequency of a digital signal processing system, many circuits are required for modulation/demodulation of a color signal. If it is intended to commonly use a clock frequency of an analog signal processing system, digital input/output cannot be performed.

A method of selecting a frequency suitable for all blocks by using a clock signal having a considerably high frequency may be considered. This method, however, provides excessive specifications for blocks for which a relatively low frequency suffices, resulting in an increase in power consumption and circuit scale.

SUMMARY OF THE INVENTION

It is an object of the present invention to solve the above-described problems.

It is another object of the present invention to efficiently supply, when processing a plurality of video signals, each circuit block for processing a corresponding signal with a clock signal.

According to one aspect, the present invention which achieves these objectives relates to a signal processing apparatus for processing a video signal, including first clock generation means for generating a first clock signal having a constant frequency, detection means for detecting a phase change in an input video signal, second clock generation means for generating a second clock signal having a frequency different from the frequency of the first clock signal by selectively using the first clock signal and an output from the detection means, and signal processing means for processing the video signal using the second clock signal.

According to another aspect, the present invention which achieves these objectives relates to a recording and reproducing apparatus, including input/output means for inputting/outputting a video signal, detection means for detecting a phase change in the video signal input from the input/output means, first clock generation means for generating a first clock signal having a constant frequency, second clock generation means for generating a second clock signal having a frequency different from the frequency of the first clock signal by selectively using an output from the detection means and the first clock signal, signal processing means for processing the video signal using the second clock signal, and recording/reproducing means for recording the video signal processed by the signal processing means on a recording medium:, and for reproducing the video signal from the recording medium and outputting the reproduced video signal to the signal processing means. The apparatus has a recording mode in which the second clock generation means generates the second clock signal using the output of the detection means, the signal processing means processes the input video signal, and the recording/reproducing means records the video signal output from the signal processing means, and a reproducing mode in which the recording/reproducing means reproduces a video signal, the second clock generation means generates the second clock signal using the first clock signal, and the signal processing means processes the reproduced video signal and outputs the resultant signal to the input/output means.

According to still another aspect, the present invention which achieves these objectives relates to a clock generating device, including first generation means for generating a first clock signal having a constant frequency, detection means for detecting an amount of a phase change in an input signal, and second generation means for generating a second clock signal by selectively using the first clock signal and an output from the detection means.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 8(a)–8(f) are timing charts illustrating the operation of the circuitry shown in FIG. 7.

DETAILED DESCRIPTION OF THE PREFERRED EMBODIMENT

A preferred embodiment of the present invention will now be described in detail with reference to the drawings.

Figure 1:
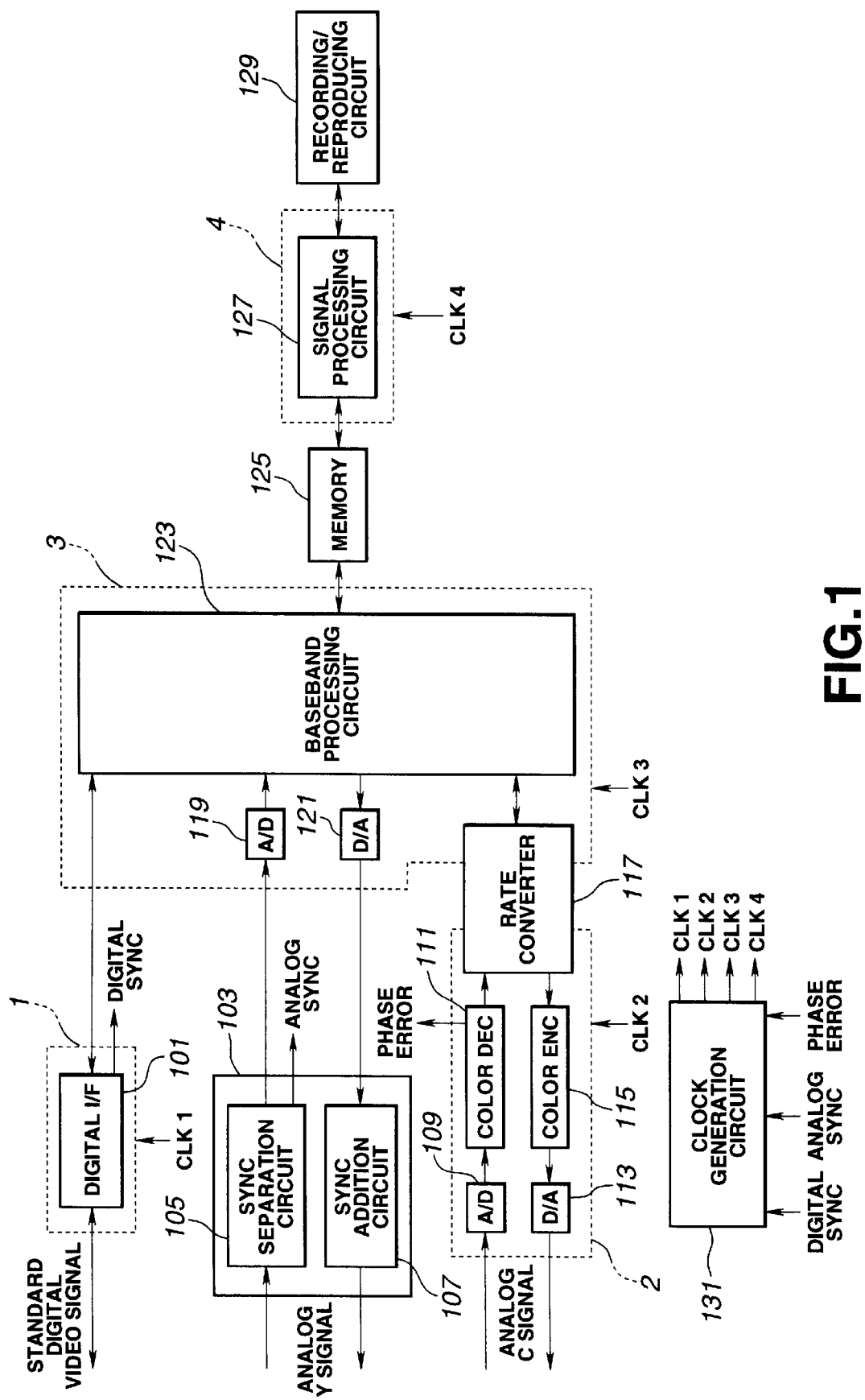
FIG. 1 is a block diagram illustrating the configuration of a digital VCR according to an embodiment of the present invention.

FIG. 1 is a block diagram illustrating the configuration of a digital VCR according to the embodiment.

In FIG. 1, blocks 1, 2, 3 and 4 are surrounded by broken lines and operate in accordance with clock signals CLK1, CLK2, CLK3 and CLK4, respectively.

First, the operation during recording will be described.

A digital I/F (interface) 101 processes a standard digital video signal. The standard digital video signal conforms to CCIR (Comité Consultatif International des Radiocommunications) 656 or SMPTE (Society of Motion Picture and Television Engineers) 125M, and has a format in which a luminance signal and a color-difference signal are transmitted by being subjected to time-division multiplexing, and a synchronizing signal is simultaneously transmitted by being multiplexed as a data pattern (called a 4:2:2 format).

In this embodiment, the clock signal CLK1 having a frequency of 27 MHz is supplied to the block 1 which includes the digital I/F 101. The digital I/F 101 separates the input standard digital video signal into a luminance signal and a color-difference signal, and detects a synchronizing signal from the input standard digital video signal. The luminance signal and the color-difference signal are output to a baseband processing circuit 123 at a rate of 13.5 MHz. The detected digital synchronizing signal (a horizontal synchronizing signal in this case) is output to a clock generation circuit 131.

An analog luminance signal is supplied to a sync separation circuit 105 within a sync processing circuit 103. This analog video signal comprises a signal having an exact time base from a broadcasting station, or a signal having an unstable time base output from a VCR, a video game device or the like.

The sync separation circuit 105 detects a horizontal synchronizing signal in the input analog luminance signal, and outputs an analog synchronizing signal and the analog luminance signal which does not include the synchronizing signal to the clock generation circuit 131 and to an A/D converter 119, respectively.

In this embodiment, the block 3 which includes the A/D converter 119 operates in accordance with the clock signal CLK3, having a frequency of 13.5 MHZ, which follows jitter in the input analog luminance signal in a manner to be described below, and the A/D converter 119 converts the analog luminance signal into a digital signal in accordance the clock signal CLK3 and outputs the digital signal to the baseband processing circuit 123.

The baseband processing circuit 123 includes a prefilter for performing subsampling of the input image signal, a subsampling circuit, a noise reducer, an OSD (on-screen display) processing circuit for adding a character signal for displaying data on a display unit (not shown) to the input signal, an interpolating filter for interpolating pixels subjected to subsampling when outputting the image signal, a circuit for adding a blanking signal, a burst signal and the like to the image signal to be output, and the like, and executes processing which can be performed without modifying a raster format.

An analog chroma signal is: converted into a digital signal by an A/D converter 109, is then decoded by a color decoder 111, and is converted into a signal string in which color-difference signals R-Y and B-Y are multiplexed.

In this embodiment, the block 2 which includes the A/D converter 109 and the color decoder 111 operates in accordance with the clock signal CLK2 having a frequency which is four times a subcarrier frequency $f_{sc}$. The color decoder 111 detects a phase error in a color burst signal in the input video signal, and outputs a phase-error signal representing the detected phase error to the clock generation circuit 131.

In this embodiment, the color decoder 111 detects the amount of the phase error based on the result of decoding the color signal. That is, the color-difference signal B-Y and the burst signal have the same frequency and a phase difference of 180 degrees and do not have other components. Hence, when the phase of the burst signal is correct, the (R-Y) component does not appear when decoding the burst signal. On the other hand, when the phase of the burst signal is incorrect, the (R-Y) component appears when decoding the burst signal. In the embodiment, the amount of the (R-Y) component obtained when decoding the burst signal is output to a control circuit 204 as a phase-error signal.

The color decoder 111 and a color encoder 115 will now be described with reference to FIGS. 2(a) and 2(b).

Figure 2A:
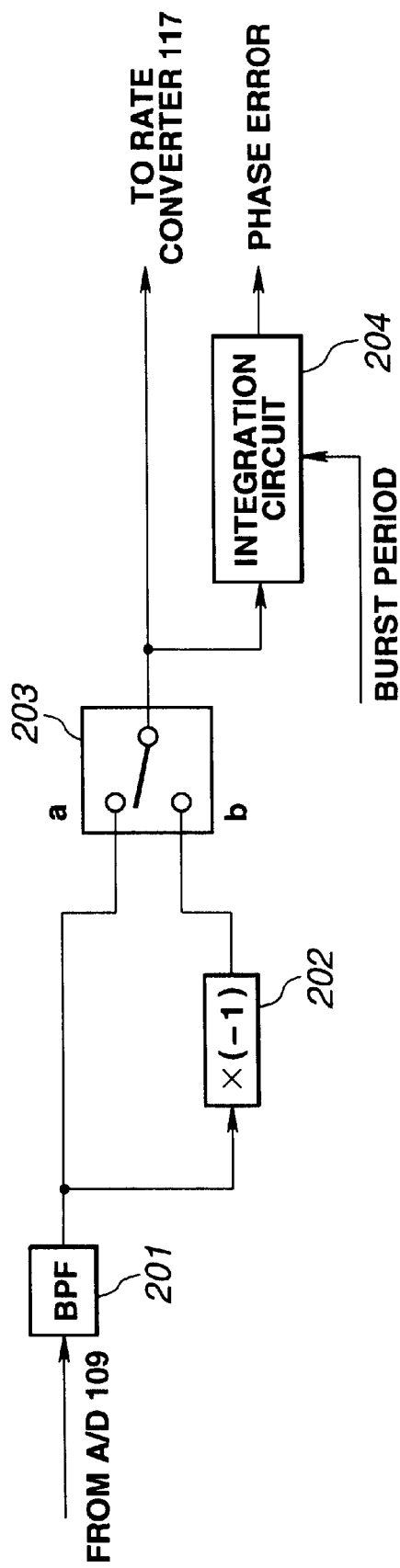
FIGS. 2(a) and 2(b) are block diagrams illustrating the configurations of a color encoder and a color decoder, respectively, shown in FIG. 1.
Figure 2B:
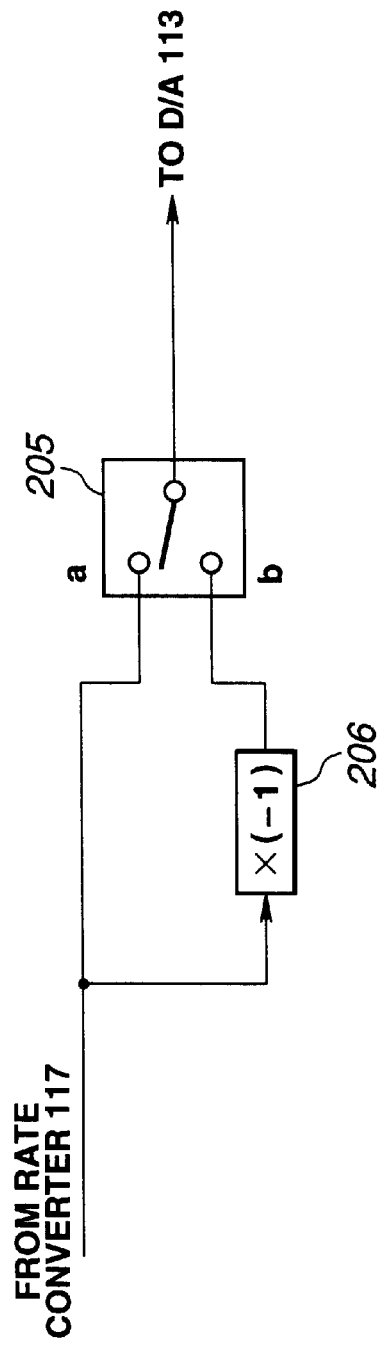

FIGS. 2(a) and 2(b) are block diagrams illustrating the configurations of the color decoder 111 and the color encoder 115, respectively.

In FIG. 2(a), the color-difference-signal string supplied from the A/D converter 109 is input to the color decoder 111. A color-difference-signal component in the input color-difference-signal string is filtered through a BPF (band-pass filter) 201 and is output to a terminal "a" of a switch 203 and to an inversion circuit 202. The inversion circuit 202 inverts the sign of the input color-difference signal and outputs the resultant signal to a terminal "b" of the switch 203. Respective samples in the color-difference-signal string supplied from the A/D converter 109 are provided in the sequence of (R-Y), (B-Y), – (R-Y) and – (B-Y). Hence, the color decoder 111 switches the switch 203 for every two samples, and outputs data indicating the absolute value of each color-difference signal output from the inversion circuit 202 by switching the switch 203 to the terminal "a" while (R-Y) and (B-Y) data are output, and to the terminal "b" while – (R-Y) and – (B-Y) data are output.

The color-difference-signal string thus decoded is output to a rate conversion circuit 117 and to an integration circuit 204.

As described above, since an (R-Y)-signal component is not generated during a burst period, it is possible to detect a phase change in the color-difference signal by integrating (R-Y) data in the color-difference-signal string output from the switch 203 during the burst period. The integration circuit 204 integrates (R-Y) data during the burst period, and outputs the obtained data to the clock generation circuit 131 as data indicating the amount of the phase error.

The color-difference signal decoded by the color decoder 111 is converted from the rate of the clock signal CLK2 ($4f_{sc}$) into the rate of the clock signal CLK3 (13.5 MHz) by the rate converter 117 having a well-known configuration, and the resultant signal is output to the baseband processing circuit 123. Since the frequency of the clock signal CLK2 is close to the frequency of the clock signal CLK3, it is generally difficult to perform rate conversion. However, in the case of a color signal, since the frequency of the zone of the signal is sufficiently lower than the clock frequency, the signal is little influenced by reflection and the like, and rate conversion can be performed with a simple circuit.

According to the above-described processing, the entire input video signal is supplied to the baseband processing circuit 123 at the rate of the clock signal CLK3.

The baseband processing circuit 123 performs the above-described processing and the like for the video signal input from the respective blocks, and writes the resultant signal in a memory 125 in accordance with the clock signal CLK3. In this embodiment, the memory 125 can store a video signal for two frames.

The block 4 which includes a signal processing circuit 127 operates in accordance with the clock signal CLK4 having a higher frequency (67.5 MHz). The signal processing circuit 127 reads the video signal from the memory 125 in accordance with the clock signal CLK4, compresses the amount of information of the signal by performing well-known processing, such as DCT (discrete cosine transform), variable-length encoding and the like, and outputs the resultant signal to a recording/reproducing circuit 129. The recording/reproducing circuit 129 performs error correction encoding, digital modulation and the like on the compressed digital video signal, and records the resultant signal on a magnetic tape.

Next, the operation during reproduction will be described.

The recording/reproducing circuit 129 reproduces the digital video signal from the magnetic tape, performs digital demodulation processing, processing of decoding error-correcting codes, and the like corresponding to the processing during recording, and outputs the resultant signal to the signal processing circuit 127. The signal processing circuit 127 expands the amount of information of the signal by performing processing inverse to the processing during recording for the digital video signal output from the recording/reproducing circuit 129, and outputs the resultant signal to the memory 125 in accordance with the clock signal CLK4.

The baseband processing circuit 123 reads the video signal from the memory 125 in accordance with the clock signal CLK3, performs interpolating processing and the like as described above for the read video signal, and outputs the resultant signal.

The digital I/F 101 converts the format of the video signal supplied from the baseband processing circuit 123 into the format of the standard digital video signal, and outputs the resultant signal.

A D/A (digital-to-analog) converter 121 converts the digital luminance signal output from the baseband processing circuit 123 into an analog signal in accordance with the clock signal CLK3, and outputs the resultant signal to a sync addition circuit 107. The sync addition circuit 107 adds a synchronizing signal to the analog luminance signal supplied from the D/A converter 121, and outputs the resultant signal.

The rate converter 117 converts the rate of the color-difference signal supplied from the baseband processing circuit 123 from the rate of the clock signal CLK5 to the rate of the clock signal CLK2, and outputs the resultant signal to the color encoder 115. The color encoder 115 modulates the color-difference signal in accordance with the clock signal CLK2 having a frequency very precisely adjusted as will be described below, to obtain a digital chroma signal, which is output to a D/A converter 113.

FIG. 2(b) is a block diagram illustrating the configuration of the color encoder 115.

The color-difference-signal string output from the rate converter 117 comprises (R-Y) and (B-Y) data which are alternately arranged, and is output to a terminal "a" of a switch 205, and to a terminal "b" of the switch 205 via an inversion circuit 206.

The switch 205 is switched for every two samples, and outputs the color-difference-signal string to the D/A converter 113 in the sequence of (R-Y), (B-Y), – (R-Y), and – (B-Y).

The D/A converter 113 converts the digital chroma signal output from the color encoder 115 into an analog signal, and outputs the analog signal.

The clock generation circuit 131 generates clock signals used in the above-described respective blocks. The clock generation circuit 131 will now be described in detail.

Figure 3:
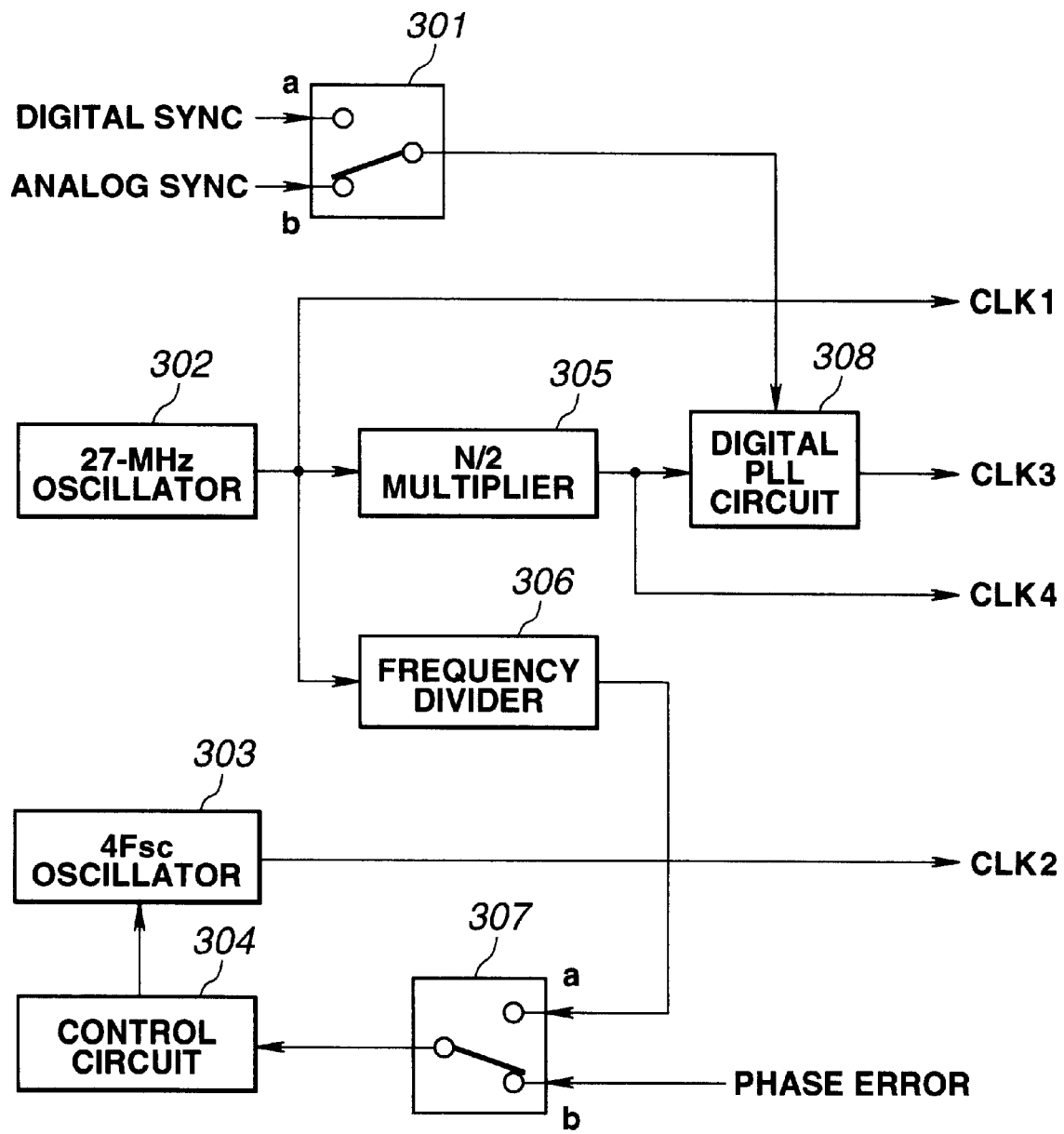
FIG. 3 is a block diagram illustrating the configuration of a clock generation circuit shown in FIG. 1.

FIG. 3 is a block diagram illustrating the configuration of the clock generation circuit 131.

In FIG. 3, an oscillator 302 generates a stable and invariable clock signal using a crystal. This 27-MHz stable clock signal is supplied to the block 1 as the clock signal CLK1, and is used as the clock signal for performing input/output processing of the standard digital video signal.

The stable clock signal from the oscillator 302 is supplied to an N/2 multiplier 305, which generates the clock signal CLK4 having a frequency which is N (N is an integer) times 13.5 MHz. In this embodiment, since a 67.5-MHz clock signal is used as the clock signal CLK4, N=5. The clock signal CLK4 is the fastest clock signal from among clock signals used in the apparatus shown in FIG. 1, and is supplied to the block 4 which includes the signal processing circuit 127.

The clock signal from the N/2 multiplier 305 is supplied to a digital PLL circuit 308. A switch 301 selectively outputs the synchronizing signal detected in the digital I/F 101 and the horizontal synchronizing signal detected by the sync processing circuit 102 as described above to a digital PLL circuit 308. The digital PLL circuit 308 generates the clock signal CLK3 from the clock signal CLK4 from the N/2 multiplier 305 in accordance with the horizontal synchronizing signal of the input video signal.

That is, by changing the frequency division ratio of a frequency divider within the digital PLL circuit 308 among 1/(N+1), 1/N and 1/(1−N) in accordance with a change in the synchronizing signal supplied from the switch 301, the digital PLL circuit 308 generates the clock signal CLK3 having a frequency of about 13.5 MHz which follows jitter in the input video signal. Since the clock signal CLK3 is obtained by performing frequency division of the clock signal CLK4, the rising edge of the clock signal CLK3 is always adjusted to the rising edge of the clock signal CLK4.

The digital PLL circuit 308 will now be described.

Figure 4:
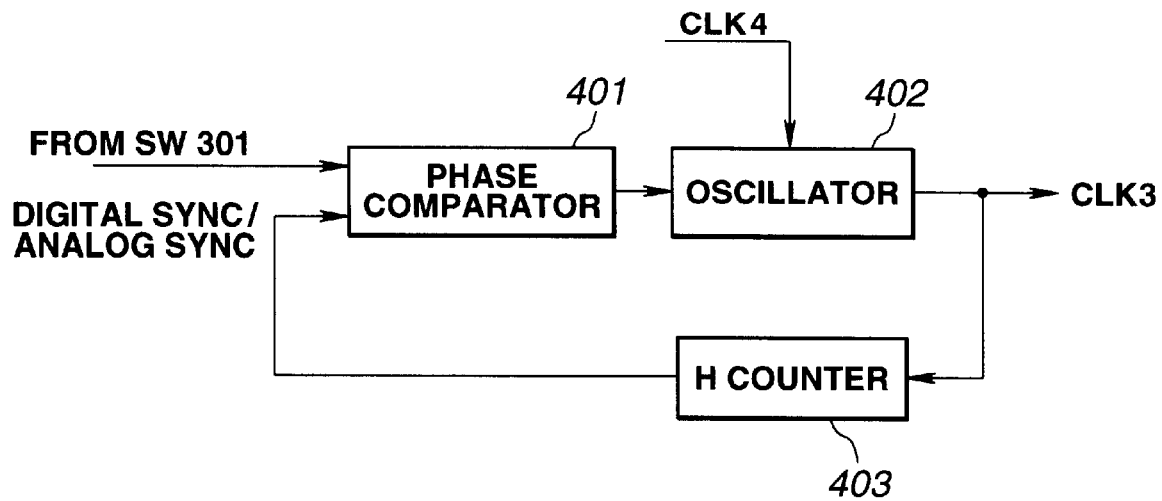
FIG. 4 is a block diagram illustrating the configuration of a digital PLL circuit shown in FIG. 3.

FIG. 4 is a block diagram illustrating the configuration of the digital PLL circuit 308.

In FIG. 4, a digital phase comparator 401 compares the phase of the horizontal synchronizing signal supplied from the switch 301 with the phase of a pulse of a horizontal synchronizing period from an H counter 403, to detect lead/delay of the phase, and the value of the phase difference of the horizontal synchronizing signal from the switch 301 relative to the pulse from the H counter, and outputs a digital signal indicating the result of the detection to a digital oscillator 402.

The digital oscillator 402 performs frequency division of the clock signal CLK4 in accordance with the output of the digital phase comparator 401, to obtain the clock signal CLK3. The H counter generates a pulse of a horizontal synchrozing period by performing frequency division of the clock signal CLK3 from the oscillator 402, and outputs the generated pulse to the phase comparator 401.

Next, the digital oscillator 402 will be described.

Figure 5:
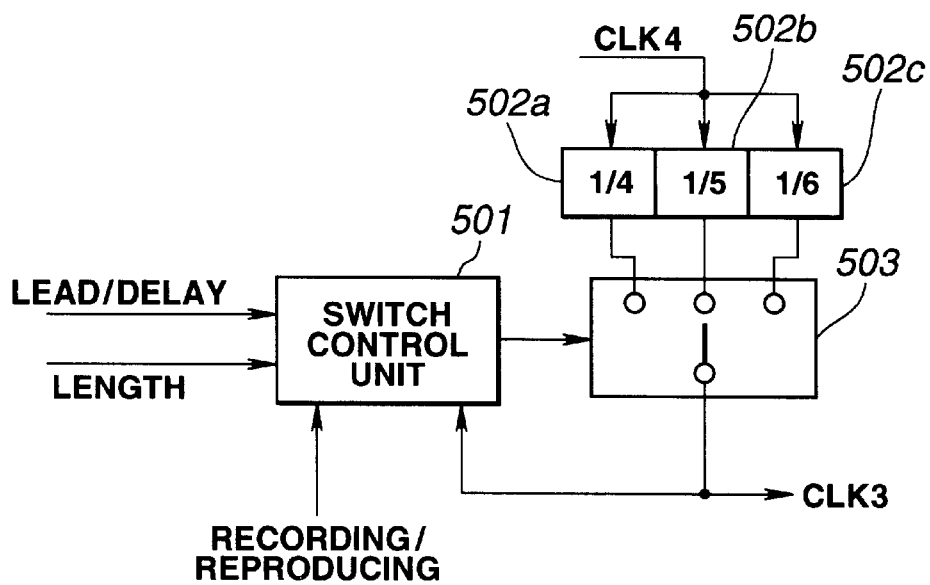
FIG. 5 is a block diagram illustrating the configuration of a digital oscillator shown in FIG. 4.

FIG. 5 is a block diagram illustrating the configuration of the digital oscillator 402.

In FIG. 5, the clock signal CLK4 is supplied to frequency dividers 502a, 502b and 502c having frequency division ratios of ¼, ⅕ and ⅙, respectively. The output signal from the phase comparator 401 is supplied. to a switch control unit 501. The switch control circuit 501 controls a switch 503 based on the: output of the phase comparator 401, to selectively output a clock signal from one of the frequency dividers.

Figure 6:
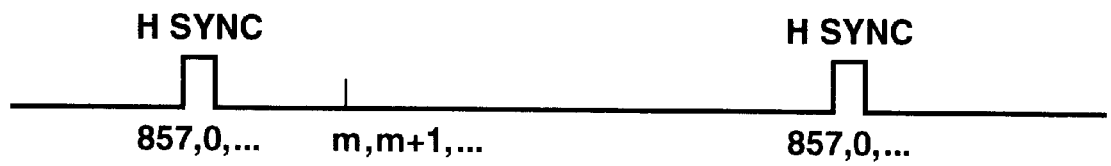
FIG. 6 is a timing chart illustrating the operation of the circuitry shown in FIG. 5.

When there is no phase difference between the horizontal synchronizing signal from the switch 301 and the pulse from the H counter 403, the switch control unit 501 selects a clock signal from the frequency divider 502b. When the phase of the input horizontal synchronizing signal advances, a clock signal from the frequency divider 502a having a lower frequency division ration, i.e., outputting a higher clock frequency, than the frequency divider 502b is selected. In the embodiment, as shown in FIG. 6, the clock signal CLK3 output from the switch 503 is counted during one horizontal period, and the switch 503 is switched from the frequency divider 502b to the frequency divider 502a until the count value reaches a predetermined value m.

The switch control unit 501 determines how long the clock signal from the frequency divider 502a is to be selected and output until the count value reaches the value. m, in accordance with a signal indicating the value of the. phase difference output from the phase comparator 401.

That is, when, for example, the phase of the input signal advances and the signal has a large phase difference, the clock signal from the frequency divider 502a is output for a long time period in accordance with the value of the phase difference, so that a large number of pulses having a period shorter than the period of pulses of the 13.5-MHz clock signal CLK3 are inserted. When the phase difference is small, the clock signal from the frequency divider 502a is output for a very short time period.

On the hand, when the phase of the input horizontal synchronizing signal delays, a clock signal from the frequency divider 502c is selected and output in the same manner as in the case of the frequency divider 502a.

When reproducing the video signal, the switch control unit 501 always selects the clock signal from the frequency divider 502b in accordance with a mode signal indicating a recording/reproducing mode output from an operation unit (not shown), and outputs a clock signal having a frequency exactly equal to 13.5 MHz as the clock signal CLK3.

Thus, the clock signal CLK3 which follows a phase change in the synchronizing signal of the input video signal during a recording operation, and which has a frequency exactly equal to 13.5 MHz during a reproducing operation is obtained.

While recording an analog video signal, a switch 307 (FIG. 3) is connected to a terminal "b" to supply the phase-error signal of the color burst signal supplied from the color decoder 111 to a control circuit 304. The control circuit 304 outputs a control signal for controlling a $4f_{sc}$ oscillator 303, comprising a VCXO (voltage controlled crystal oscillator), based on the phase-error signal supplied from the switch 307. As a result, the $4f_{sc}$ oscillator 303 generates the clock signal CLK2, having a frequency of $4f_{sc}$, whose phase is synchronized with the subcarrier of the input signal.

The operation of generating the clock signal CLK2 when inputting the color signal, i.e., during a recording operation, will now be described with reference to FIGS. 7 and 8(a)–8(f).

Figure 7:
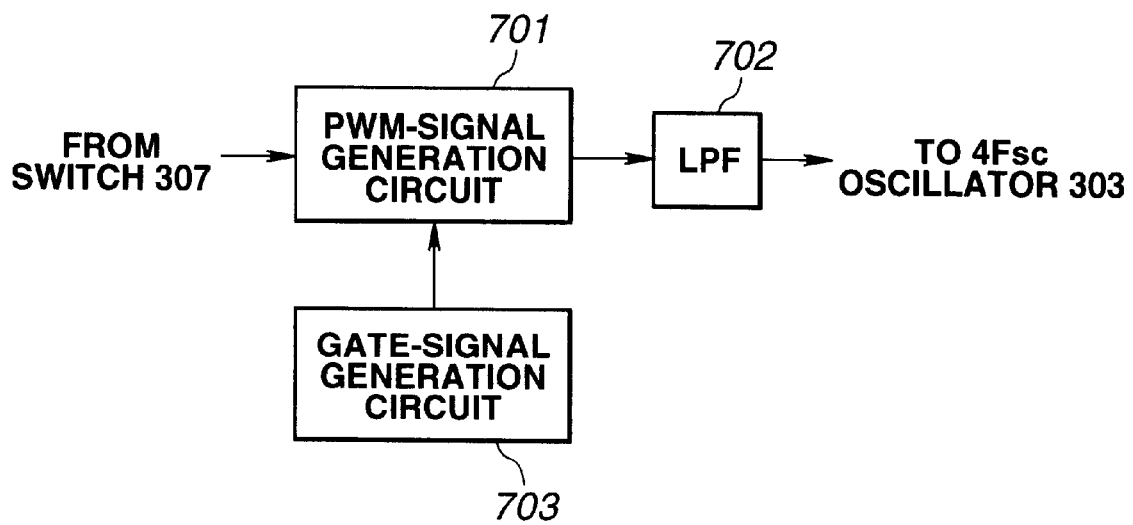
FIG. 7 is a block diagram illustrating the configuration of a control circuit shown in FIG. 3.

FIG. 7 is a block diagram illustrating the configuration of the control circuit 304. FIGS. 8(a)–8(f) are timing charts illustrating the operation of the circuit shown in FIG. 7.

FIG. 8(a) illustrates timings in the input analog video signal. A phase-error signal shown in FIG. 8(b) is obtained from the color decoder 111. In FIG. 7, a gate-signal generation circuit 703 outputs a gate signal shown in FIG. 8(c) to a PWM (pulse-width modulation)-signal generation circuit 701 while the phase-error signal is output from the color decoder 111.

That is, since the color decoder 111 detects a phase error based on the result of decoding the input burst signal, the period of the gate signal delays from the input timing of the burst signal for a time required for decoding of the input burst signal and determination of the phase error based on the decoded result. The PWM-signal generation circuit 701 outputs a control signal for controlling the $4f_{sc}$ oscillator 303 to a LPF (low-pass filter) 702 in the form of a PWM signal, based on the phase-error signal input during a period assigned by the gate signal. FIG. 8(d) illustrates the state of output of the PWM signal.

The LPF 702 filters the control signal output from the PWM-signal generation circuit 701, and performs feedback of the resultant signal to the $4f_{sc}$ oscillator 303 as a low-frequency-component signal. The capacity of a capacitor within the $4f_{sc}$ oscillator 303 is changed based on the control signal supplied from the LPF 702, so that the oscillation frequency of the $4f_{sc}$ oscillator 303 changes.

When outputting the analog color signal, i.e., during a reproducing operation, very high accuracy is required for the frequency $4f_{sc}$ of the clock signal CLK2 used for modulating the color signal as described above.

The VCXO of the $4f_{sc}$ oscillator 303 used for generating the clock signal CLK2 has a certain tolerance in the frequency range in order to follow jitter in the input color signal. Accordingly, in order to obtain the clock signal CLK2 by oscillating the VCXO with its own frequency when outputting the color signal, accuracy in the frequency is insufficient, and therefore it is necessary to separately provide a circuit for adjusting the frequency.

On the other hand, the oscillator 302 generates a 27-MHz clock signal which is stable and very precisely adjusted as described above. Accordingly, in this embodiment, the control circuit 304 controls the oscillator 303 by using a signal obtained by performing frequency division of the 27-MHz clock signal from the oscillator 302 by a frequency divider 306, in order to precisely oscillate the oscillator 303. Since the oscillator 303 is a PLL circuit controlled at every horizontal period, the frequency division ratio of the frequency divider 306 is selected so that the output after frequency division has a period equal to or an integer multiple of one horizontal period.

The operation of generating the clock signal CLK2 when outputting the color signal will now be described with reference to the timing charts shown in FIGS. 8(a)–8(f).

FIG. 8(e) illustrates an output obtained by performing frequency division of the 21-MHz. clock signal from the oscillator 302 by the frequency divider 306. The gate-signal generation circuit 703 shown in FIG. 7 generates a gate signal at the same timing as when the analog color signal is input, i.e., the timing shown in FIG. 8(c), and outputs the generated gate signal to the PWM-signal generation circuit 701. This gate signal can be generated by counting a timing from the horizontal synchronizing signal. The frequency division ratio of the frequency divider 306 is a value so as to provide a signal which generates only one rising edge during the period of the gate signal shown in FIG. 8(c).

The PWM-signal generation circuit 701 generates a PWM signal as shown in FIG. 8(f) by utilizing the rising edge of the signal after frequency division input from the frequency divider 306 via the switch 307 during the period of the gate signal, and outputs the generated PWM signal to the LPF 702. As described above, in this embodiment, a PWM signal is generated utilizing the rising edge of the signal after frequency division input during the period of the gate signal. Hence, it is possible to change the duty ratio of the PWM signal in accordance with a phase change in the signal after frequency division.

The PWM signal output from the PWM-signal generation circuit 701 is filtered as when recording the analog color signal, to provide a low-frequency component, which is subjected to feedback to the $4f_{sc}$ oscillator 303. The $4f_{sc}$ oscillator 303 changes its oscillation frequency in accordance with the control signal from the LPF 702 in the above-described manner.

In this embodiment, when the control circuit 304 generates a control signal for the $4f_{sc}$ oscillator 303, a PWM signal and a LPF are used instead of a D/A converter. Hence, a one-bit serial terminal suffices as a terminal for outputting the PWM signal.

As described above, the respective clock signals are obtained by the clock generation circuit 131.

In summing up the respective clock signals, the clock signal CLK1 is a stable clock signal having a fixed frequency. The clock signal CLK4 is also a stable clock signal because it has a frequency in the relationship of an integer ratio with the frequency of the clock signal CLK1. While the clock signal CLK3 follows the input analog luminance signal from a macroscopic point of view, it is obtained by performing frequency division of the clock signal CLK4 from a microscopic point of view, and does not include jitter and the like. The clock signal CLK2 is locked to the subcarrier of the input analog chroma signal. Hence, it can be understood that all of the clock signals except the clock signal CLK2 are in synchronism although they have different frequencies, and are stable clock signals which do not include jitter and the like.

Accordingly, it is unnecessary to provide an additional circuit, such as a FIFO or the like, in order to exchange mutual signals between blocks having different clock frequencies, and it is possible to directly exchange the signals.

Furthermore, it is possible to commonly perform processing, such as filtering and the like, for a digital video signal, an analog luminance signal and an analog chroma signal in the baseband processing circuit 123.

When outputting a color signal, the oscillation frequency of the $4f_{sc}$ oscillator is controlled using a clock signal from the oscillator 302 which is very precisely adjusted. Hence, it is possible to obtain a very precise clock signal necessary for modulation without providing an additional circuit for clock adjustment.

Although in the embodiment, the frequency division ratio of the frequency divider of the digital PLL circuit 308 is changed in accordance with the synchronizing signal separated from the standard digital video signal, the frequency division ratio may be fixed to 1/N when inputting the standard digital video signal.

Although in the embodiment, the $4f_{sc}$ osillator is controlled using the PWM signal, the control signal may be generated using a D/A converter.

Although in the embodiment, the frequency division ratio of the oscillator within the digital PLL circuit is set to ¼, ⅕ or ⅙, the frequency division ratio may have a value larger than these values, and more frequency dividers may also be prepared.

In this case, since the frequencies of clock signals output from respective frequency dividers are close (the periods of pulses are close), more precise control can be performed.

As described above, according to the embodiment, it is possible to obtain a very precise clock signal with a relatively small circuit.

The individual components designated by blocks in the drawings are all well-known in the video-signal processing apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal processing apparatus for processing a video signal, comprising:

first clock generation means for generating a first clock signal which is a stable clock signal having a constant frequency;

detection means for detecting a phase change in an input video signal;

second clock generation means for generating a second clock signal having a frequency different from the frequency of the first clock signal by selectively using the first clock signal and an output from said detection means, said second clock generation means including selecting means for selecting one of the first clock signal and the output from said detection means; and signal processing means for processing the video signal using the second clock signal.

2. An apparatus according to claim 1, wherein the video signal includes a chroma signal, and wherein said signal processing means comprises a color decoder for obtaining a color-difference signal by decoding the chroma signal in accordance with the second clock signal.

3. An apparatus according to claim 2, wherein said color decoder decodes the chroma signal using the second clock signal generated by said second clock generation means using the output of said detection means.

4. An apparatus according to claim 2, wherein said detection means detects the phase change based on an output from said color decoder.

5. An apparatus according to claim 2, wherein said signal processing means comprises an analog-to-digital converter for converting the chroma signal into a digital signal in accordance with the second clock signal, and for outputting the digital signal to said color decoder.

6. An apparatus according to claim 1, wherein the video signal includes a color-difference signal, and wherein said signal processing means comprises a color encoder for obtaining a chroma signal by encoding the color-difference signal in accordance with the second clock signal.

7. An apparatus according to claim 6, wherein said color encoder encodes the color-difference signal using the second clock signal generated by said second clock generation means using the first clock signal.

8. An apparatus according to claim 6, wherein the chroma signal output from said color encoder comprises a digital signal, and wherein said signal processing means comprises a digital-to-analog converter for converting the digital chroma signal into an analog signal in accordance with the second clock signal.

9. An apparatus according to claim 1, wherein said signal processing means comprises:
   a color decoder for decoding a chroma signal in accordance with the second clock signal and for outputting a color-difference signal; and
   a color encoder for encoding a color-difference signal in accordance with the second clock signal and for outputting a chroma signal,
   and wherein said apparatus has a first mode, in which said second clock generation means generates the second clock signal using the output of said detection means and said color decoder operates, and a second mode, in which said second clock generation means generates the second clock signal using the first clock signal and said color encoder operates.

10. An apparatus according to claim 1, wherein said signal processing means further comprises first signal processing means for processing the video signal using the first clock signal.

11. An apparatus according to claim 10, wherein said first signal processing means comprises an input/output circuit for inputting/outputting a digital video signal.

12. An apparatus according to claim 1, further comprising third clock generation means for generating a third clock signal having a frequency different from the frequency of the second clock signal using the first clock signal, and wherein said signal processing means comprises third signal processing means for processing the video signal using the third clock signal.

13. An apparatus according to claim 12, wherein said third signal processing means comprises a spatial filter, and a subsampling circuit for performing subsampling processing for the video signal filtered by said spatial filter.

14. An apparatus according to claim 1, further comprising fourth clock generation means for generating a fourth clock signal different from the first clock signal using the first clock signal, wherein said signal processing means comprises fourth signal processing means for processing the video signal using the fourth clock signal.

15. An apparatus according to claim 14, wherein said fourth signal processing means comprises compression means for compressing an amount of information of the video signal, and expansion means for expanding an amount of information of the video signal.

16. An apparatus according to claim 15, further comprising recording/reproducing means for recording the input video signal processed by said signal processing means on a recording medium, and for reproducing the video signal from the recording medium and outputting the reproduced video signal to said signal processing means, wherein said apparatus has a recording mode in which said second clock generation means generates the second clock signal using the output of said detection means, and in which said signal processing means processes the input video signal, and in which said recording/reproducing means records the video signal, and a reproducing mode in which said recording/reproducing means reproduces the video signal, and in which said second clock generation means generates the second clock signal using the first clock signal, and in which said signal processing means processes the video signal reproduced by said recording/reproducing means.

17. An apparatus according to claim 1, wherein said first clock generation means comprises a quartz oscillator.

18. An apparatus according to claim 1, wherein said second clock generation means comprises PWM(pulse-width modulation)-signal generation means for generating a PWM signal by selectively using the first clock signal and the output of said detection means, and a control oscillator for changing an oscillation frequency thereof in accordance with the PWM signal.

19. A recording and reproducing apparatus, comprising:
   input/output means for inputting/outputting a video signal;
   detection means for detecting a phase change in the video signal input from said input/output means;
   first clock generation means for generating a first clock signal having a constant ;frequency;
   second clock generation means for generating a second clock signal having a frequency different from the frequency of the first clock signal by selectively using an output from said detection means and the first clock signal;
   signal processing means for processing the video signal using the second clock signal; and
   recording/reproducing means for recording the video signal processed said the signal processing means on a recording medium, and for reproducing the video signal from the recording medium and outputting the reproduced video signal to said signal processing means,
      wherein said apparatus has a recording mode in which: (i) said second clock generation means generates the second clock signal using the output of said detection means; (ii) said signal processing means processes the input video signal, and (iii) said recording/reproducing means records the video signal output from said signal processing means, and a reproducing mode in which: (i) said recording/reproducing means reproduces the video signal; (ii) said second clock generation means generates the second clock signal using the first clock signal; and (iii) said signal processing means processes the reproduced video signal and outputs the resultant signal to said input/output means.

20. An apparatus according to claim 19, further comprising digital input/output means for inputting/outputting a digital video signal using the first clock signal, wherein said signal processing means also processes the digital video signal.

21. An apparatus according to claim 19, further comprising fourth clock generation means for generating a fourth clock signal having a frequency higher than the frequency of the first clock signal using the first clock signal, wherein said signal processing means comprises (i) compression means for compressing an amount of information of the input video signal using the fourth clock signal and outputting the compressed video signal to said recording/reproducing means, and (ii) expansion means for expanding an amount of information of the reproduced video signal using the fourth clock signal.

22. A clock generating device, comprising:
   input/output means for inputting and outputting a signal;
   first generation means for generating a first clock signal which is a stable clock signal having a constant frequency;
   detection means for detecting an amount of a phase change in an input signal input by said input/output means; and
   second generation means for generating a second clock signal by selectively using the first clock signal and an output from said detection means, said second clock generation means including selecting means for selecting one of the first clock signal and the output from said detection means, wherein said device has a first mode, in which said input/output means inputs the signal and said second generation means generates the second clock signal using the output of said detection means, and a second mode, in which said input/output means outputs the signal and said second generation means generates the second clock signal using the first clock signal.

23. A device according to claim 22, wherein said second generation means comprises:

PWM-signal generation means for generating a PWM signal by selectively using the first clock signal and the output of said detection means; and control oscillation means for changing an oscillation frequency of said PWM-signal generation means in accordance with the PWM signal.

24. A signal processing apparatus comprising:

a clock generator that generates a first clock signal which is a stable clock signal having a constant frequency;

a multiplier that receives the first clock signal from said clock generator and generates a second clock signal which is a stable clock signal having a second frequency higher than the frequency of the first clock signal; and oscillation means for receiving the second clock signal from said multiplier and for generating a third clock signal by frequency dividing the second clock signal, a rising edge of the third clock signal being adjusted to a rising edge of the second clock signal, said oscillation means having a first mode, in which said oscillation means generates the third clock signal following a jitter in an input video signal, and a second mode, in which said oscillation means generates the third clock signal having a constant frequency.

25. An apparatus according to claim 24, wherein said oscillation means, in said first mode, changes a frequency division ratio according to the jitter of the input video signal.

26. An apparatus according to claim 24, wherein said oscillation means, in said second mode, frequency divides the second clock signal by a constant frequency division ratio.

27. An apparatus according to claim 24, further comprising:

a digital interface circuit that processes a digital video signal according to the first clock signal.

28. An apparatus according to claim 24, further comprising:

a signal processing circuit that processes the input video signal, said signal processing circuit including an A/D converter that converts, in the first mode, the input video signal into a digital video signal according to the third clock signal.

29. An apparatus according to claim 28, further comprising:

a compression processing circuit that compresses the digital video signal obtained by said signal processing circuit according to the second clock signal.

* * * * *

UNITED STATES PATENT AND TRADEMARK OFFICE
CERTIFICATE OF CORRECTION

PATENT NO. : 6,453,109 B1
DATED : September 17, 2002
INVENTOR(S) : Yukinori Yamamoto It is certified that error appears in the above-identified patent and that said Letters Patent is hereby corrected as shown below:

Column 1,
Line 13, "supplied:." should read -- supplied --.

Column 2,
Line 21, "medium:," should read -- medium, --.

Column 3,
Line 64, "is:" should read -- is --.

Column 6,
Line 14, "from:the" should read -- from the --.

Column 7,
Line 4, "the:" should read -- the --.
Line 12, "ration," should read -- ratio, --.
Line 22, "the." should read -- the --.
Line 33, "the hand," should read -- the other hand, --.

Column 12,
Line 13, "; frequency;" should read -- frequency; --.
Line 22, "processed said the" should read -- processed by said --.

Signed and Sealed this

Eighteenth Day of February, 2003

JAMES E. ROGAN
*Director of the United States Patent and Trademark Office*